(12) United States Patent
Sung et al.

(10) Patent No.: US 12,170,447 B2
(45) Date of Patent: Dec. 17, 2024

(54) ELECTRONIC DEVICE FOR WIRELESSLY CHARGING EXTERNAL ELECTRONIC DEVICE

(71) Applicant: Samsung Electronics Co., Ltd., Suwon-si (KR)

(72) Inventors: Jungoh Sung, Suwon-si (KR); Juhyang Lee, Suwon-si (KR); Myungkyoon Chung, Suwon-si (KR); Youngmi Ha, Suwon-si (KR); Hojong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 17/662,996

(22) Filed: May 11, 2022

(65) Prior Publication Data

US 2022/0271564 A1  Aug. 25, 2022

Related U.S. Application Data

(63) Continuation of application No. 16/793,312, filed on Feb. 18, 2020, now Pat. No. 11,374,432.

(30) Foreign Application Priority Data

Feb. 19, 2019 (KR) .......................... 10-2019-0019114
May 13, 2019 (KR) .......................... 10-2019-0055770

(51) Int. Cl.
*H02J 50/12* (2016.01)
*H02J 7/02* (2016.01)
(Continued)

(52) U.S. Cl.
CPC ................ *H02J 50/12* (2016.02); *H02J 7/02* (2013.01); *H02J 50/80* (2016.02); *H02J 50/90* (2016.02)

(58) Field of Classification Search
USPC ........................................................ 320/108
See application file for complete search history.

(56) References Cited

U.S. PATENT DOCUMENTS 8,129,864 B2  3/2012  Baarman et al.
9,087,638 B2  7/2015  Oettinger
(Continued)

FOREIGN PATENT DOCUMENTS

CN        102738858 A       10/2012
CN        107046319 A        8/2017
(Continued)

OTHER PUBLICATIONS

Notification of Transmittal of the International Search Report and the Written Opinion of the International Searching Authority, or the Declaration dated May 22, 2020 in connection with International Patent Application No. PCT/KR2020/001723, 11 pages.

(Continued)

*Primary Examiner* — Bryce M Aisaka

(57) ABSTRACT

An electronic includes: a housing including a first plate, a second plate, and a side member; a display; a conductive coil parallel to the second plate and disposed between the display and the second plate; a wireless charging circuitry electrically connected to the conductive coil; and a processor operatively connected with the display and the wireless charging circuitry. The wireless charging circuitry receives a signal for wirelessly transferring power to an external electronic device from the processor, receives information about the external electronic device, receives a power control signal from the external electronic device via the conductive coil, applies a charging current of a first frequency to the conductive coil based at least in part on a request signal, increases a frequency of the charging current, com- (Continued)

pares the increased frequency with a first value, and adjusts a duty cycle of the charging current.

6 Claims, 8 Drawing Sheets

(51) Int. Cl.
  *H02J 50/80* (2016.01)
  *H02J 50/90* (2016.01)

(56) References Cited

U.S. PATENT DOCUMENTS

| | | |
|---|---|---|
| 9,257,851 B2 | 2/2016 | Baarman et al. |
| 10,170,935 B2 | 1/2019 | Baarman et al. |
| 10,742,075 B2 | 8/2020 | Lee et al. |
| 2009/0174263 A1 | 7/2009 | Baarman et al. |
| 2012/0119588 A1 | 5/2012 | Baarman et al. |
| 2012/0261998 A1 | 10/2012 | Sato |
| 2014/0159500 A1 | 6/2014 | Sankar et al. |
| 2016/0134134 A1 | 5/2016 | Baarman et al. |
| 2017/0025887 A1* | 1/2017 | Hyun ............... H02J 50/90 |
| 2017/0040831 A1 | 2/2017 | Desai et al. |
| 2017/0070079 A1 | 3/2017 | Manova-Elssibony |
| 2018/0175677 A1 | 6/2018 | Lee et al. |
| 2019/0305580 A1* | 10/2019 | Lee ............... H02J 7/00714 |

FOREIGN PATENT DOCUMENTS

| | | |
|---|---|---|
| CN | 108123548 A | 6/2018 |
| KR | 10-2010-0110356 A | 10/2010 |
| KR | 10-1560853 B1 | 10/2015 |
| WO | 2013090565 A1 | 6/2013 |

OTHER PUBLICATIONS

The First Office Action dated Oct. 25, 2023, in connection with Chinese Application No. 202010101372.9, 11 pages.
Written Decision on Registration dated Aug. 8, 2024, in connection with Korean Application No. 10-2019-0055770, 10 pages.

* cited by examiner

ELECTRONIC DEVICE FOR WIRELESSLY CHARGING EXTERNAL ELECTRONIC DEVICE

CROSS-REFERENCE TO RELATED APPLICATIONS

This application is a continuation of application Ser. No. 16/793,312, filed Feb. 18, 2020, which is based on and claims priority under 35 U.S.C. § 119 to Korean Patent Application No. 10-2019-0019114, filed on Feb. 19, 2019, and Korean Patent Application No. 10-2019-0055770, filed on May 13, 2019, in the Korean Intellectual Property Office, the disclosures of which are incorporated by reference herein their entirety.

BACKGROUND

1. Field

The disclosure relates to technologies of enhancing wireless charging performance of an electronic device.

2. Description of Related Art

A battery may be embedded in an electronic device (e.g., a smartphone). The electronic device may perform various functions (e.g., a function of executing an application) using power stored in the battery.

Whenever the battery is discharged, a user may charge the battery in a wired or wireless manner. For a wired charging scheme, the user may directly connect the electronic device and a travel adaptor (TA) using a cable to charge the battery. For a wireless charging scheme, when the user puts the electronic device on a wireless charging device (e.g., a wireless charging pad), the wireless charging pad may charge the battery.

However, because the battery is charged through a separate device (e.g., the TA or the wireless charging device) in both the wired charging scheme and the wireless charging scheme, the user may charge the battery in only the state where he or she carries the separate device. Thus, recently, technologies capable of charging the battery without the separate device have been actively developed. For example, technologies of allowing the electronic device to directly charge a battery of an external electronic device have been actively developed.

The above information is presented as background information only to assist with an understanding of the present disclosure. No determination has been made, and no assertion is made, as to whether any of the above might be applicable as prior art with regard to the present disclosure.

SUMMARY

When an electronic device charges a battery of an external electronic device in a wireless charging scheme, the electronic device and the external electronic device may come into contact with each other. For example, as the electronic device and the external electronic device come into contact with each other, when a conductive coil of the electronic device and a conductive coil of the external electronic device are aligned, the electronic device may transfer power to the external electronic device through a specific frequency band.

However, when the conductive coil of the electronic device and the conductive coil of the external electronic device are very close in distance to each other, charging may fail to be performed or charging efficiency may be unstable. Particularly, when charging power is low in a process of starting charging, charging efficiency may be more unstable.

Aspects of the disclosure are to address at least the above-mentioned problems and/or disadvantages and to provide at least the advantages described below. Accordingly, an aspect of the disclosure is to provide an electronic device for stably charging an external electronic device.

In accordance with an aspect of the disclosure, an electronic device is provided. The electronic device may include a housing including a first plate, a second plate spaced apart from the first plate and facing the first plate, and a side member which at least partially surrounds a space between the first plate and the second plate, a display located in the space and shown through the first plate, a conductive coil parallel to the second plate and disposed between the display and the second plate, a wireless charging circuitry electrically connected to the conductive coil, and a processor operatively connected with the display and the wireless charging circuitry. The wireless charging circuitry may be configured to receive a signal, enabling the wireless charging circuitry, for wirelessly transferring power to an external electronic device, from the processor, receive information about the external electronic device from the external electronic device via the conductive coil, receive a power control signal from the external electronic device via the conductive coil, apply a charging current of a first frequency to the conductive coil based at least in part on a request signal, increase a frequency of the charging current, compare the increased frequency with a first value, and adjust a duty cycle of the charging current based on at least in part on the compared result.

In accordance with another aspect of the disclosure, an electronic device is provided. The electronic device may include a housing including a first plate, a second plate spaced apart from the first plate and facing the first plate, and a side member which at least partially surrounds a space between the first plate and the second plate, a display located in the space and shown through the first plate, a conductive coil parallel to the second plate and disposed between the display and the second plate, a wireless charging circuitry electrically connected to the conductive coil, and a processor operatively connected with the display and the wireless charging circuitry. The processor may apply a charging current to the conductive coil via the wireless charging circuitry, when receiving a power control signal from an external electronic device, may increase a frequency of the charging current to have a first value, and may decrease a duty cycle of the charging current to have a second value between a minimum duty cycle and a maximum duty cycle, which are adjustable by the wireless charging circuitry, when the frequency of the charging current is the first value.

In accordance with another aspect of the disclosure, a method for wirelessly charging an external electronic device is provided. The method may include receiving a power control signal via a conductive coil from the external electronic device, applying a charging current to the conductive coil via a wireless charging circuitry, increasing a frequency of the charging current to have a first value, and decreasing a duty cycle of the charging current to have a second value between a minimum duty cycle and a maximum duty cycle, which are adjustable by the wireless charging circuitry, when the frequency of the charging current is the first value.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
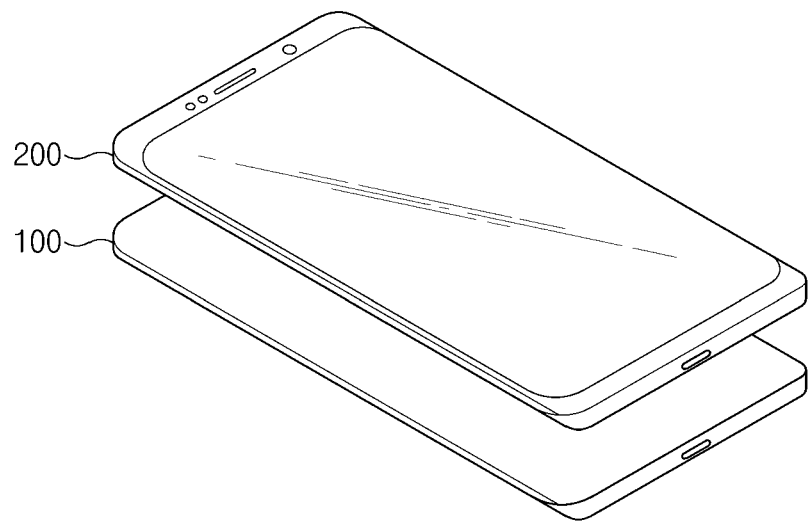
FIG. 1 is a drawing illustrating an appearance in which an electronic device charges an external electronic device according to an embodiment.

FIG. 1 is a drawing illustrating an appearance in which an electronic device charges an external electronic device according to an embodiment.

Referring to FIG. 1, an electronic device 100 may charge an external electronic device 200. For example, when a battery of the external electronic device 200 is insufficient or discharged, the electronic device 100 may transfer the power of a battery disposed in the electronic device 100 to the external electronic device 200 to charge a battery of the external electronic device 200.

According to an embodiment, the electronic device 100 may periodically detect whether the external electronic device 200 is close to the electronic device 100. For example, the electronic device 100 may enable a wireless power transfer function and may perform an operation of detecting a target (e.g., the external electronic device 200) to wirelessly transfer power. When the external electronic device 200 is close to the electronic device 100, the electronic device 100 may identify the external electronic device 200. When the external electronic device 200 is a device which supports wireless charging, the electronic device 100 may perform the wireless charging.

According to an embodiment, the electronic device 100 may receive a power control signal from the external electronic device 200. The electronic device 100 may apply a charging current to a conductive coil disposed in the electronic device 100 in response to receiving the power control signal.

According to an embodiment, the electronic device 100 may adjust a frequency and/or a duty cycle of a charging power to adjust intensity of the charging power transferred to the external electronic device 200. For example, the frequency of the charging power and the intensity of the charging power may be inversely proportional to each other, and the duty cycle of the charging power and the intensity of the charging power may be proportional to each other.

According to an embodiment, because power required by the external electronic device 200 is low at a time when wireless charging is started (or at an initial time of the wireless charging), to adjust intensity of charging power, the electronic device 100 may perform an operation of increasing a frequency of the charging power and decreasing a duty cycle of the charging power. For example, because current does not flow in a wireless charging circuitry (e.g., a wireless charging circuitry 250 of FIG. 4A) included in the external electronic device at the time when the wireless charging is started (or at the initial time of the wireless charging), power required by the external electronic device 200 may be low. Thus, the external electronic device 200 may request the electronic device 100 to transfer a low transmit power.

According to an embodiment, at a time when wireless charging is started (or at an initial time of the wireless charging), the electronic device 100 may increase a frequency of a charging current until the frequency of the charging current (charging power) is a first value (e.g., 110 KHz to 148 KHZ). When the frequency of the charging current is the first value, the electronic device 100 may decrease a duty cycle of the charging current until the duty cycle of the charging current (charging power) is a second value (e.g., 30%). The second value may be greater than a minimum value (e.g., 20%) of the duty cycle adjustable by the electronic device 100.

When the duty cycle decreases to the minimum value, because power transferred from the electronic device 100 to the external electronic device 200 is not sufficient, a voltage drop of the electronic device 100 may occur. Thus, charging may fail to be performed, and charging efficiency may be unstable. Particularly, as the electronic device 100 and the external electronic device 200 come into contact with each other, when a conductive coil (e.g., a conductive coil 140 of FIG. 4A) included in the electronic device 100 is very close in distance to a conductive coil (e.g., a conductive coil 240 of FIG. 4A) included in the external electronic device 200, charging efficiency may be more unstable.

When the duty cycle of the charging current is the second value (e.g., 30%), the electronic device 100 according to an embodiment of the disclosure may maintain the duty cycle not to be reduced any longer. Thus, although the conductive coil included in the electronic device 100 is very close in distance to the conductive coil included in the external electronic device 200 (or although a distance between the conductive coil included in the electronic device 100 and the conductive coil included in the external electronic device 200 is within a specified range), the electronic device 100 may transfer sufficient power to the external electronic device 200, and a voltage drop of the external electronic device 200 may fail to occur. For example, the specified range between the conductive coils may be a range defined in wireless power consortium (WPC).

Figure 2:
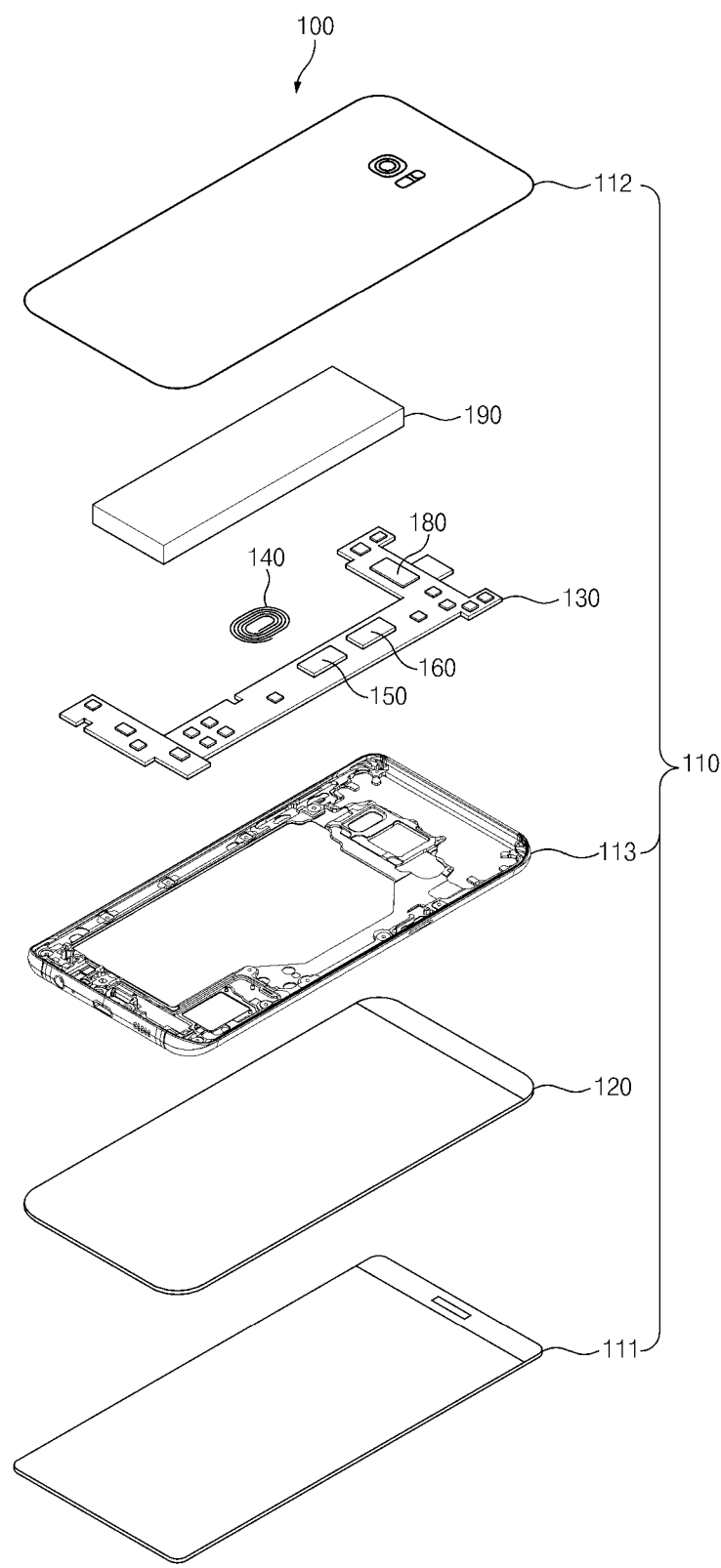
FIG. 2 is an exploded perspective view illustrating an electronic device according to an embodiment.

FIG. 2 is an exploded perspective view illustrating an electronic device according to an embodiment. FIG. 2 is an exploded perspective view illustrating an electronic device 100 shown in FIG. 1.

Referring to FIG. 2, the electronic device 100 may include a housing 110, a display 120, a printed circuit board 130, a conductive coil 140, a wireless charging circuitry 150, a processor 160, a memory 180, and a battery 190. According to an embodiment, the electronic device 100 may exclude some of the components shown in FIG. 2 or may further include another component which is not shown in FIG. 2. Furthermore, an order where the components included in the electronic device 100 are laminated may differ from a laminated order shown in FIG. 2.

The housing 110 may form the appearance of the electronic device 100. For example, the housing 110 may include a first plate 111, a second plate 112 opposite to the first plate 111, and a side member 113 which surrounds between the first plate 111 and the second plate 112.

The first plate 111 may transmit light generated by the display 120. Furthermore, a user may come into contact with the first plate 111 with a part (e.g., a finger) of his or her body to perform a touch (including contact using an electronic pen). The first plate 1110 may be formed of, for example, tempered glass, reinforced plastic, flexible polymer materials, or the like. According to an embodiment, the first plate 1110 may be referred to as a glass window.

The side member 113 may protect the components included in the electronic device 100. For example, the display 120 and the printed circuit board 130 may be mounted in the side member 113. The side member 113 may protect the components from an external impact.

The second plate 112 may be combined with a rear surface of the electronic device 100. The second plate 112 may be formed of coated or colored glass, ceramics, polymer, metal (or aluminum, stainless steel (STS), or magnesium) or at least two combinations of the materials. According to an embodiment, the second plate 112 may be integrally implemented with the side member 113 or may be implemented to be removable by a user.

The display 120 may be disposed between the first plate 111 and the printed circuit board 130. The display 120 may be electrically connected with the printed circuit board 130 to output content (e.g., a text, an image, a video, an icon, a widget, or a symbol) or receive a touch input (e.g., a touch, a gesture, or hovering) from the user.

The printed circuit board 130 may mount various electronic parts, elements, printed circuits, or the like of the electronic device 100. For example, the printed circuit board 130 may mount the wireless charging circuitry 150, the processor 160, and the memory 180. In the disclosure, the printed circuit board 130 may be referred to as a main board, a printed board assembly (PBA), or a PCB.

The conductive coil 140 may be disposed between the second plate 112 and the printed circuit board 130. When a charging current flows in the conductive coil 140, the conductive coil 140 may transfer a charging power to an external electronic device (e.g., an external electronic device 200 of FIG. 1). According to an embodiment, the conductive coil 140 may receive information about the external electronic device 200 and a power control signal from the external electronic device 200.

The wireless charging circuitry 150 may be operatively connected with the conductive coil 140 and the processor 160. The wireless charging circuitry 150 may receive an enable signal for transferring wireless power from the processor 160. When the enable signal is received, the wireless charging circuitry 150 may apply a charging current to the conductive coil 140. According to an embodiment, the wireless charging circuitry 150 may change a frequency and a duty cycle of the charging current (or charging power). For example, when the electronic device 100 receives the power control signal from the external electronic device 200, the wireless charging circuitry 150 may increase a frequency of the charging current and may decrease a duty cycle of the charging current. According to an embodiment, the wireless charging circuitry 150 may receive a signal for requesting to increase or decrease a charging power from the external electronic device 200 and may increase or decrease the charging power based on the signal. Furthermore, the wireless charging circuitry 150 may receive an amount of power received by the external electronic device 200 from the external electronic device 200. When the amount of power is less than or equal to a specified level, the wireless charging circuitry 150 may increase the charging power. On the other hand, when the amount of power is greater than the specified level, the wireless charging circuitry 150 may decrease the charging power.

The wireless charging circuitry 150 may receive a signal enabling the wireless charging circuitry 150, for transferring wireless power to the external electronic device 200, from the processor 160. In response to receiving the enable signal, the wireless charging circuitry 150 may receive information about the external electronic device 200 through the conductive coil 140. Moreover, the wireless charging circuitry 150 may receive a power control signal from the external electronic device 200 and may apply a charging current of a first frequency to the conductive coil 140 based at least in part on the request signal.

The wireless charging circuitry 150 may increase a frequency of the charging current and may compare the increased frequency with a first value. The first value may correspond to a maximum frequency value providable by the wireless charging circuitry 150. When the increased frequency corresponds to the first frequency as a result of the comparison, the wireless charging circuitry 150 may adjust a duty cycle of the charging current. For example, the wireless charging circuitry 150 may adjust the duty cycle of the charging current within a first range between a lower limit and an upper limit of the duty cycle.

The processor 160 may receive a power control signal from the external electronic device 200. The processor 160 may apply a charging current to the conductive coil 140 via the wireless charging circuitry 150 in response to receiving the power control signal. In this case, the processor 160 may increase a frequency of the charging current until a frequency of the charging current (or charging power) is a first value (e.g., 110 KHz to 148 KHz) via the wireless charging circuitry 150. When the frequency of the charging current is the first value, the processor 160 may decrease a duty cycle of the charging current until the duty cycle of the charging current is a second value (e.g., 30%) through the wireless charging circuitry 150. The second value may be greater than a minimum value (e.g., 20%) of the duty cycle adjustable by the processor 160.

According to an embodiment, the processor 160 may perform wireless charging based on a user input. For example, in a state where the electronic device 100 and the external electronic device 200 come into contact with each other, the processor 160 may execute a wireless charging protocol in response to a user input. When the wireless charging is started, the processor 160 may receive a power control signal from the external electronic device 200 and may adjust a frequency and a duty cycle of the charging current based on the power control signal.

When receiving a power control signal from the external electronic device 200, an existing electronic device may decrease a duty cycle of a charging current to the minimum value. When the duty cycle decreases to the minimum value, because power transferred from the existing electronic device to the external electronic device 200 is not sufficient, a voltage drop of the external electronic device 200 may occur. Thus, charging may fail to be performed, and charging efficiency may be unstable. However, when the duty cycle of the charging current is the second value (e.g., 30%), the electronic device 100 according to an embodiment of the disclosure may maintain the duty cycle not to be reduced any longer. Thus, the electronic device 100 may transfer sufficient power to the external electronic device 200, and a voltage drop of the external electronic device 200 may fail to occur.

According to an embodiment, the processor 160 may transmit a charging current at a frequency of the first value and at a duty cycle of the second value via the wireless charging circuitry 150 during a selected time period. The second value may be any one value between an upper limit and a lower limit of the duty cycle. After the selected time period, the processor 160 may adjust a frequency and a duty cycle of the charging current to a default value and may change the default value based on a request of the external electronic device 200.

The memory 180 may be disposed on the printed circuit board 130. The memory 180 may store instructions and various programs, which are executed by the processor 160.

The battery 190 may convert chemical energy and electrical energy in both directions. For example, the battery 190 may convert chemical energy into electrical energy and may supply the converted electrical energy to the display 120 or various components or modules mounted on the printed circuit board 130. Alternatively, the battery 190 may convert electrical energy supplied from the outside into chemical energy and may store the converted chemical energy. According to an embodiment, a power management module for managing charging and discharging of the battery 190 may be included in the printed circuit board 130. In the disclosure, contents described with reference to FIG. 2 are also applicable to components having the same reference denotations as those of the electronic device 100 shown in FIG. 2.

Figure 3:
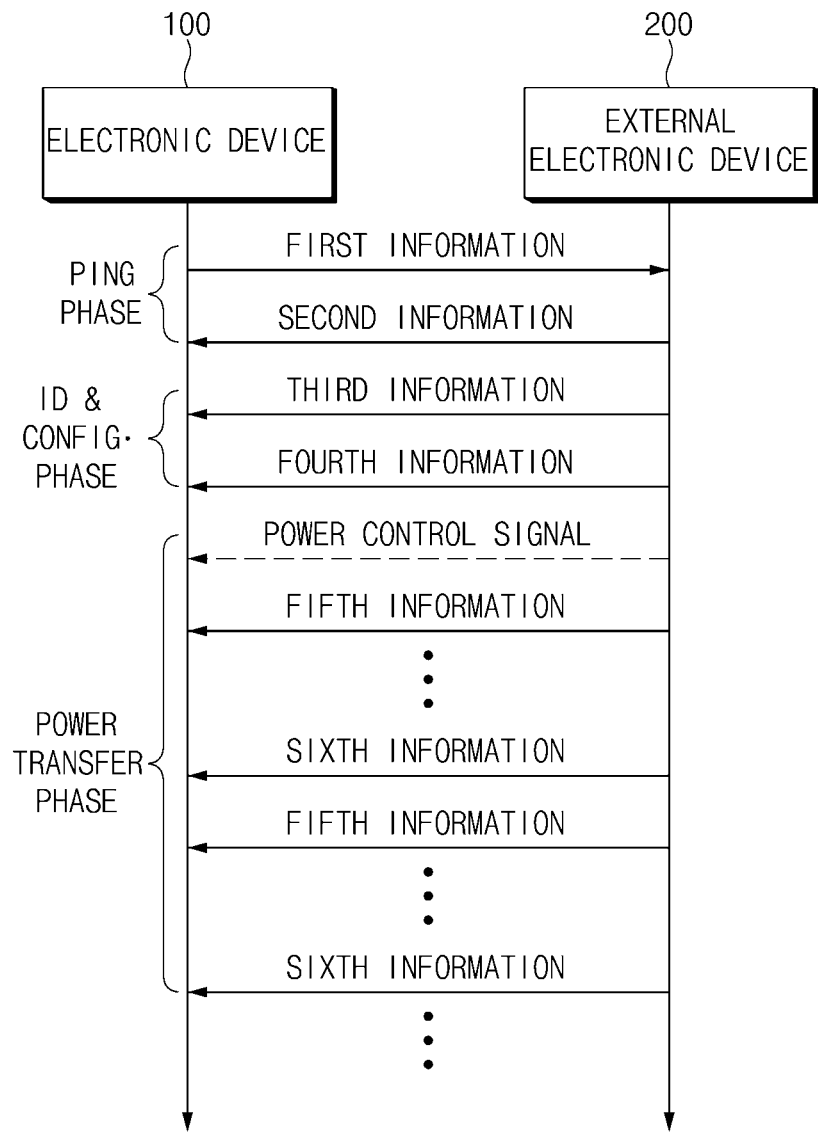
FIG. 3 is a signal sequence diagram illustrating operations of an electronic device and an external electronic device according to an embodiment.

FIG. 3 is a signal sequence diagram illustrating operations of an electronic device and an external electronic device according to an embodiment. FIG. 3 is a signal sequence diagram illustrating in detail an order where an electronic device and an external electronic device shown in FIG. 1 are operated.

Referring to FIG. 3, the electronic device 100 and the external electronic device 200 may enter a first state. The first state may be a state where the electronic device 100 detects the external electronic device 200, which may be referred to as a "ping phase". In the first state, the electronic device 100 may transmit first information for detecting the external electronic device 200 to the external electronic device 200. According to an embodiment, in the first state, the electronic device 100 may periodically transmit the first information to the external electronic device 200. In the first state, the electronic device 100 may transmit the first information to the electronic device 200 at minimum power capable of recognizing the external electronic device 200. Receiving the first information, the external electronic device 200 may transmit second information for starting a wireless charging protocol to the electronic device 100. In the disclosure, the first information and the second information may be referred to as a "digital ping" and a "signal strength packet", respectively.

When wireless charging is started as the external electronic device 200 transmits the second information, the electronic device 100 and the external electronic device 200 may enter a second state. The second state may be a state where the electronic device 100 identifies the external electronic device 200, which may be referred to as an "identification and configuration phase". In the second state, the external electronic device 200 may transmit third information which is information (e.g., a WPC version, a manufacturer, and/or a product code) associated with identifying the external electronic device 200 and fourth information which is information (e.g., a power class and/or maximum power) associated with a power of the external electronic device 200 to the electronic device 100. In the disclosure, the third information and the fourth information may be referred to as an "identification packet" and a "configuration packet", respectively.

When the external electronic device 200 is recognized, the electronic device 100 and the external electronic device 200 may enter a third state. The third state may be a state where the electronic device 100 transfers power to the external electronic device 200, which may be referred to as a "power transfer phase". In the third state, the external electronic device 200 may transmit fifth information for requesting to increase or decrease power to be transferred and sixth information indicating a power value received by the external electronic device 200 to the electronic device 100. While the wireless charging is performed, the electronic device 100 may repeatedly receive the fifth information and the sixth information from the external electronic device 200. The electronic device 100 may increase or decrease power to be transferred, based on the fifth information and the sixth information. In the disclosure, the fifth information and the sixth information may be referred to as a "control error packet" and a "received power packet", respectively.

According to an embodiment, when entering the third state, the electronic device 100 may receive a power control signal from the external electronic device 200. The electronic device 100 may apply a charging current to a conductive coil (e.g., a conductive coil 140 of FIG. 2) disposed in the electronic device 100 in response to receiving the power control signal. In this case, the electronic device 100 may increase a frequency of the charging current until a frequency of the charging current is a first value (e.g., 110 KHz to 148 KHz). When the frequency of the charging current is the first value, the electronic device 100 may decrease a duty cycle of the charging current until the duty cycle of the charging current is a second value (e.g., 30%). The second value may be greater than a minimum value (e.g., 20%) of the duty cycle adjustable by the electronic device 100.

When the duty cycle decreases to the minimum value, because power transferred from the electronic device 100 to the external electronic device 200 is not sufficient, a voltage drop of the external electronic device 200 may occur. Thus, charging may fail to be performed, and charging efficiency may be unstable. Particularly, as the electronic device 100 and the external electronic device 200 come into contact with each other, when the conductive coil 140 included in the electronic device 100 and a conductive coil included in the external electronic device 200 are very close in distance to each other, charging efficiency may be more unstable.

When the duty cycle of the charging current is the second value (e.g., 30%) in the third state, the electronic device 100 according to an embodiment of the disclosure may maintain the duty cycle not to be reduced any longer. Thus, although the conductive coil 140 included in the electronic device 100 and the conductive coil included in the external electronic device 200 are very close in distance to each other, the electronic device 100 may transfer suitable power to the external electronic device 200, and a voltage drop of the external electronic device 200 may fail to occur.

Figure 4A:
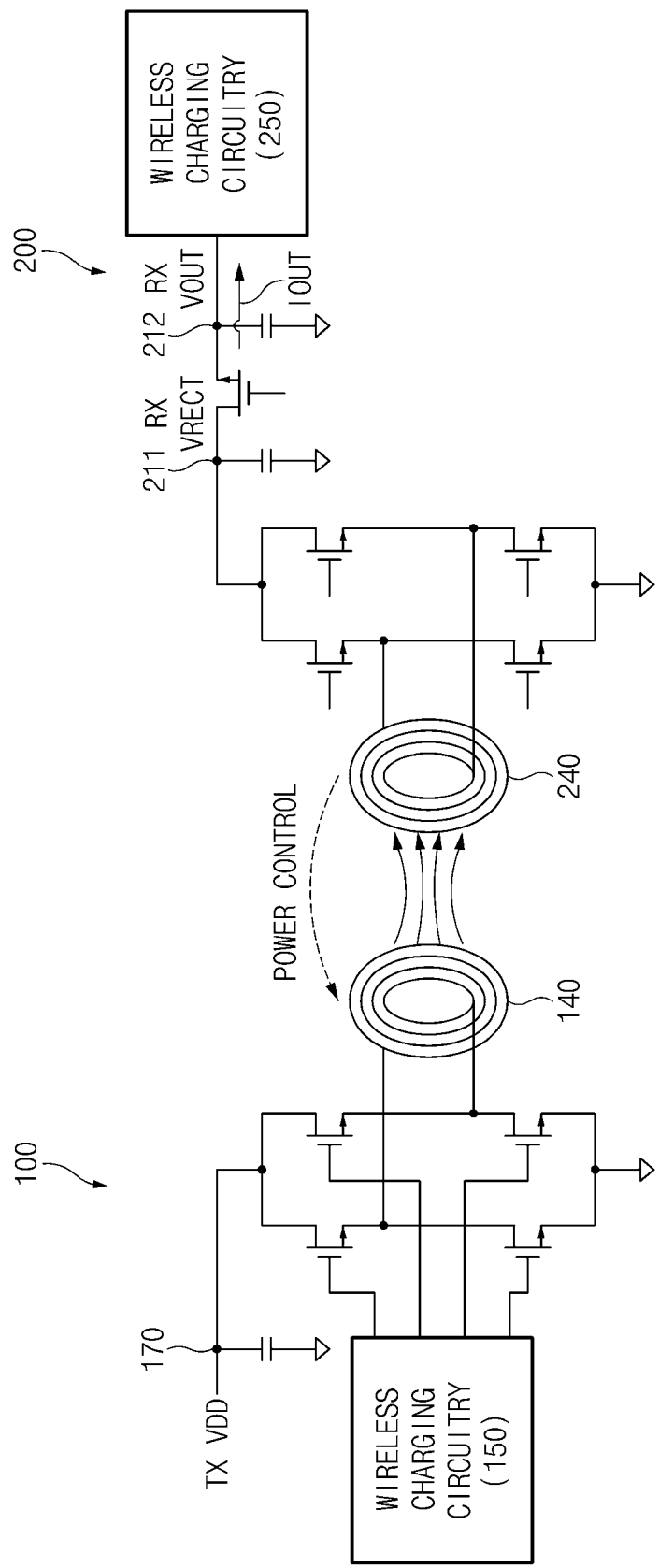
FIG. 4A is a circuit diagram illustrating a connection relationship between an electronic device and an external electronic device according to an embodiment.
Figure 4B:
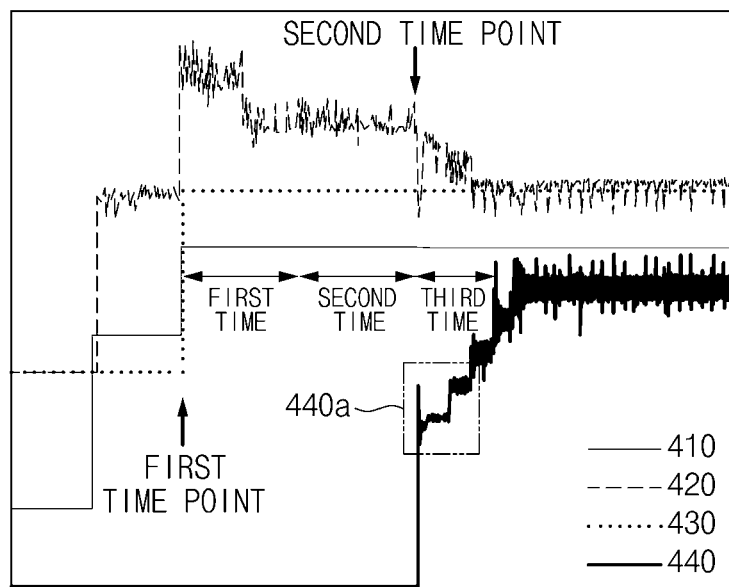
FIG. 4B is a drawing illustrating voltage and current applied to an electronic device and an external electronic device according to an embodiment.

FIG. 4A is a circuit diagram illustrating a connection relationship between an electronic device and an external electronic device according to an embodiment. FIG. 4B is a drawing illustrating voltage and current applied to an electronic device and an external electronic device according to an embodiment.

Referring to FIG. 4A, an electronic device 100 may include a wireless charging circuitry 150 and a conductive coil 140. An external electronic device 200 may include a wireless charging circuitry 250 and a conductive coil 240. A charging current applied from the wireless charging circuitry 150 of the electronic device 100 may flow through the conductive coil 140 of the electronic device 100. When the charging current flows in the conductive coil 140 of the electronic device 100, current may flow in the conductive coil 240 of the external electronic device 200. Through the process, a charging power may be transferred to the external electronic device 200.

Referring to FIG. 4B, a first graph 410 indicates voltage applied to a first point 170 of the electronic device 100. A second graph 420 indicates voltage applied to a first point 211 of the external electronic device 200. A third graph 430 indicates voltage applied to a second point 212 of the external electronic device 200. A fourth graph 440 indicates current which flows in the second point 212 of the external electronic device 200. Referring to the first to fourth graphs 410 to 440, the electronic device 100 may gradually increase the voltage of the first point 170 until a first time point. In the disclosure, the first time point may refer to a time when the electronic device 100 starts to transfer power to the external electronic device 200. For example, the first time point may refer to a time when a third state shown in FIG. 3 is started. When the voltage of the first point 170 is gradually increased until the first time point, voltage at the first point 211 and the second point 212 of the external electronic device 200 may be gradually increased.

According to an embodiment, the electronic device 100 may increase a frequency of a charging current from the first time point and may decrease a duty cycle of the charging current. Because power required by the external electronic device 200 is low at a time when wireless charging is started (or at an initial time of the wireless charging), the electronic device 100 may increase the frequency of the charging current and may decrease the duty cycle of the charging current, thus decreasing intensity of the charging power. For example, the electronic device 100 may increase the frequency of the charging current during a first time from the first time point. When the frequency of the charging current is increased, the electronic device 100 may decrease the duty cycle of the charging current during a second time subsequent to the first time. When the frequency of the charging current is increased and when the duty cycle of the charging current is decreased, the voltage at the first point 211 of the external electronic device 200 may be gradually decreased. Thus, the voltage at the first point 211 and the voltage at the second point 212 may be almost similar to each other.

According to an embodiment, the electronic device 100 may increase the frequency of the charging current until the frequency of the charging current is a first value (e.g., 110 KHz to 148 KHz) from the first time point. When the frequency of the charging current is the first value, the electronic device 100 may decrease the duty cycle of the charging current until the duty cycle of the charging current is a second value (e.g., 30%). The second value may be greater than the minimum value (e.g., 20%) of the duty cycle adjustable by the electronic device 100. For example, when the duty cycle of the charging current is kept not less than the second value, current which flows in the second point 212 at a second time point may be greater than or equal to a certain level. In the disclosure, the second time point may refer to a time when current is applied to the wireless charging circuitry 250 of the external electronic device 200. Because the current which flows in the second point 212 also remains more than the certain level, the electronic device 100 may transfer sufficient power to the external electronic device 200, and a voltage drop of the external electronic device 200 may fail to occur.

An existing electronic device may decrease a duty cycle of a charging current to a minimum value at the second time point. When the duty cycle decreases to the minimum value, voltage at the first point 211 and the second point 212 of the external electronic device 200 and current which flows in the second point 212 may decrease to less than or equal to the certain level. Thus, charging may fail to be performed, and charging efficiency may be unstable. However, when the duty cycle of the charging current is the second value (e.g., 30%), the electronic device 100 according to an embodiment of the disclosure may maintain the duty cycle not to be reduced any longer. Because the duty cycle is maintained at the second value, as shown in the fourth graph 440 and a first region 440a, the current flowing in the second point 212 may be greater than or equal to the certain level and power may be stably transferred to the external electronic device 200.

According to an embodiment, when the current flowing in the second point 212 starts to be increased, the electronic device 100 may decrease the frequency of the charging current and may increase the duty cycle of the charging current. In other words, when a certain time elapses after wireless charging is started and when the current flowing in the second point 212 is stably increased, to increase a charging power, the electronic device 100 may decrease the frequency of the charging current and increase the duty cycle of the charging current, during a third time.

Figure 5:
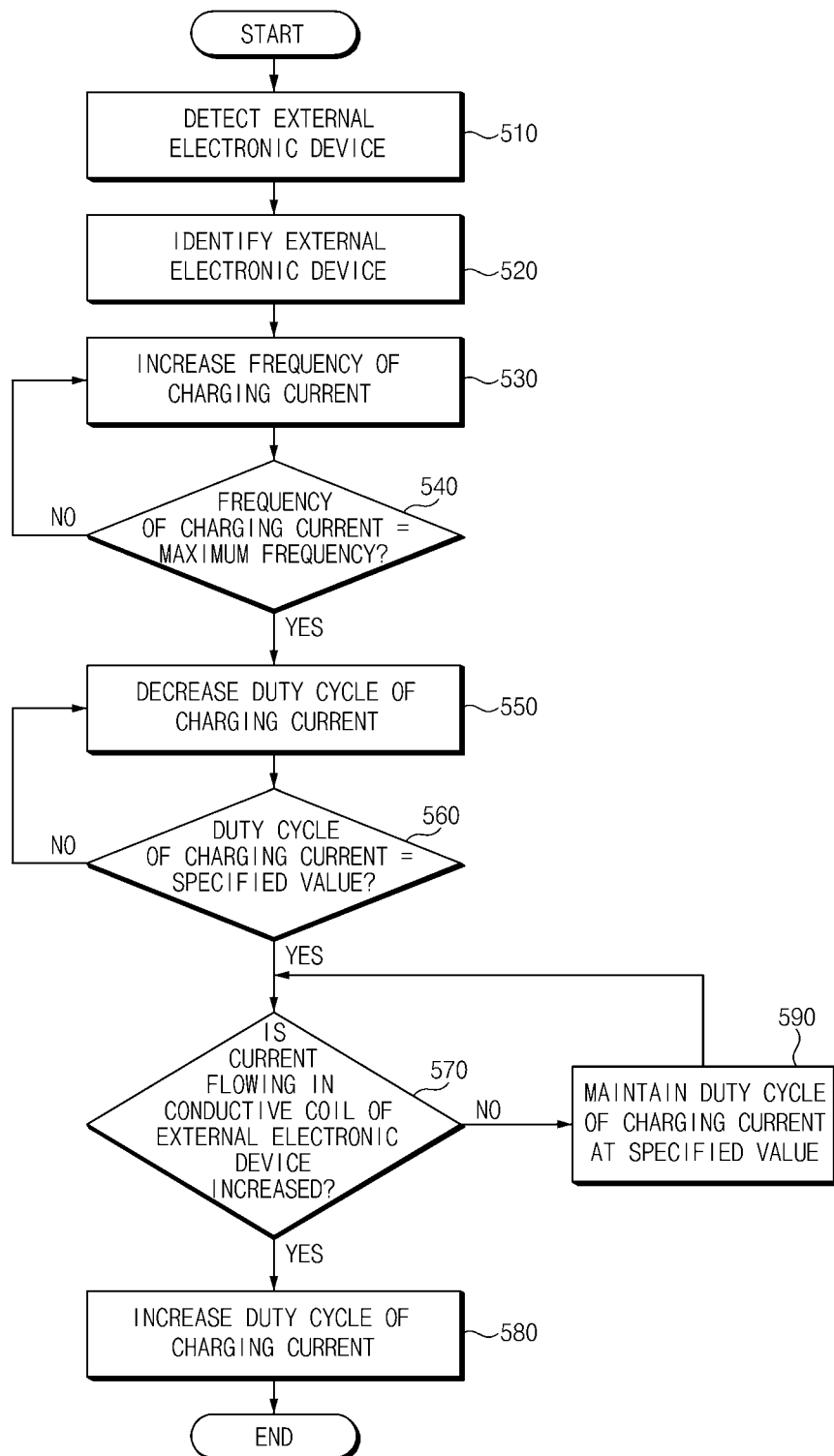
FIG. 5 is a flowchart illustrating an operation of an electronic device according to an embodiment.

FIG. 5 is a flowchart illustrating an operation of an electronic device according to an embodiment. FIG. 5 is a flowchart illustrating an operation of an electronic device 100 shown in FIG. 1.

Referring to FIG. 5, in operation 510, the electronic device 100 may detect an external electronic device 200. For example, the electronic device 100 may transmit a digital ping to the external electronic device 200 to detect whether the external electronic device 200 is close to or in contact with the electronic device 100.

In operation 520, the electronic device 100 may identify the external electronic device 200. For example, the electronic device 100 may receive an identification packet from the external electronic device 200 and may identify a type, a manufacturer, and/or a product code of the external electronic device 200 based on the identification packet.

In operation 530, when wireless charging is started, the electronic device 100 may increase a frequency of a charging current. In this case, the electronic device 100 may maintain a duty cycle of the charging current. According to an embodiment, the amount of a charging power required by the external electronic device 200 may be very small at a time when the wireless charging is started. Thus, when the wireless charging is started, the electronic device 100 may increase the frequency of the charging current and may decrease the duty cycle of the charging current, thus decreasing the amount of the charging power.

In operation 540, the electronic device 100 may determine whether the frequency of the charging current increases to a maximum frequency (e.g., a first value) adjustable by the electronic device 100. When the frequency of the charging current is not the maximum frequency, operation 530 may be performed again. When the frequency of the charging current is the maximum frequency, operation 550 may be performed.

In operation 550, the electronic device 100 may decrease the duty cycle of the charging current. In this case, the electronic device 100 may maintain the frequency of the charging current.

In operation 560, the electronic device 100 may determine whether the duty cycle of the charging current decreases to a specified value (e.g., a second value). The specified value may refer to any one value between a maximum duty cycle and a minimum duty cycle, which are adjustable by the electronic device 100. When the duty cycle of the charging current is not the specified value, operation 550 may be performed again.

In operation 570, the electronic device 100 may determine whether current flowing in a conductive coil of the external electronic device 200 is increased. When the current flowing in the conductive coil of the external electronic device 200 increases to greater than or equal to a specified level as a result of the determination, in operation 580, the electronic device 100 may increase the duty cycle of the charging current. In this case, the electronic device 100 may decrease the frequency of the charging current. On the other hand, when the current flowing in the conductive coil of the external electronic device 200 does not increase to greater than or equal to the specified level as a result of the determination, in operation 590, the electronic device 100 may maintain the duty cycle of the charging current at the specified value.

Meanwhile, the embodiments described with reference to FIGS. 1 to 5 are illustrative, and various embodiments of the disclosure are not limited to the embodiments described with reference to FIGS. 1 to 5. For example, the electronic device 100 may change voltage applied to a conductive coil and/or a phase of a charging power other than the frequency and duty cycle of the charging power. Furthermore, the electronic device 100 may first decrease the duty cycle of the charging power to a specified value and may increase a frequency of the charging power to a maximum frequency.

Figure 6:
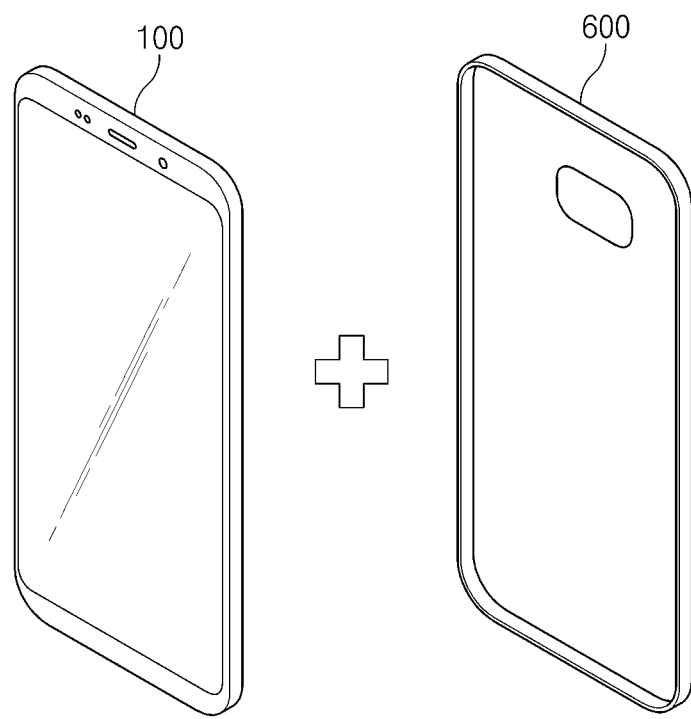
FIG. 6 is a drawing illustrating an electronic device and a case device according to an embodiment.

FIG. 6 is a drawing illustrating an electronic device and a case device according to an embodiment. FIG. 6 is a drawing illustrating an electronic device 100 according to another embodiment.

Referring to FIG. 6, the electronic device 100 may be combined with a case device 600. The case device 600 may protect the appearance of the electronic device 100 from an external impact.

According to an embodiment, the electronic device 100 may detect whether it is combined with the case device 600. For example, a sensor or a magnet may be included in the case device 600. The electronic device 100 may detect whether it is combined with the case device 600, based on a signal generated by the case device 600. For example, a near field communication (NFC) chip may be embedded in each of the electronic device 100 and the case device 600, and the electronic device 100 may detect whether the case device 600 is combined with the electronic device 100, through the NFC chip.

According to an embodiment, when wirelessly charging an external electronic device (e.g., an external electronic device 200 of FIG. 4A) in the state where the case device 600 is combined with the electronic device 100, the electronic device 100 may fail to perform the operations described with reference to FIGS. 1 to 5. For example, when the case device 600 is combined with the electronic device 100 and when there is a certain separation distance between the electronic device 100 and the external electronic device 200, because a shadow region does not occur, although the electronic device 100 decreases a duty cycle of a charging current to a minimum duty cycle, a voltage drop may fail to occur. Thus, when wirelessly charging the external electronic device 200 in the state where the case device 600 is combined with the electronic device 100, the electronic device 100 may decrease the duty cycle to a minimum duty cycle.

According to an embodiment, in wirelessly charging the external electronic device 200, the electronic device 100 may determine whether the case device 600 is combined with the electronic device 100 and/or the external electronic device 200. As a result of the determination, when there is a certain separation distance between a conductive coil (e.g., a conductive coil 140 of FIG. 4A) of the electronic device 100 and a conductive coil (e.g., a conductive coil 240 of FIG. 4A) of the external electronic device 200, the electronic device 100 may fail to perform the operations described with reference to FIGS. 1 to 5.

According to an embodiment, the electronic device 100 may further include a wireless communication circuitry located in a space between a first plate (e.g., a first plate 111 of FIG. 2) and a second plate (e.g., a second plate 112 of FIG. 2). A processor (e.g., a processor 160 of FIG. 2) may receive information about whether a housing (e.g., a housing 110 of FIG. 2) is combined with the case device 600, via the wireless communication circuitry, and may adjust the duty cycle within a second range between a second value and an upper limit based on the information.

An electronic device 100 according to an embodiment disclosed in the disclosure may include a housing 110 including a first plate 111, a second plate 112 spaced apart from the first plate 111 and facing the first plate 111, and a side member 113 which at least partially surrounds a space between the first plate 111 and the second plate 112, a display 120 located in the space and shown through the first plate 111, a conductive coil 140 parallel to the second plate 112 and disposed between the display 120 and the second plate 112, a wireless charging circuitry 150 electrically connected to the conductive coil 140, and a processor 160 operatively connected with the display 120 and the wireless charging circuitry 150. The wireless charging circuitry 150 may be configured to receive a signal enabling the wireless charging circuitry 150, for wirelessly transferring power to an external electronic device 200, from the processor 160, receive information about the external electronic device 200 from the external electronic device 200 via the conductive coil 140, receive a power control signal from the external electronic device 200 via the conductive coil 140, apply a charging current of a first frequency to the conductive coil based at least in part on a request signal, increase a frequency of the charging current, compare the increased frequency with a first value, and adjust a duty cycle of the charging current based at least in part on the compared result.

The first value according to an embodiment disclosed in the disclosure may be a maximum frequency value providable by the wireless charging circuitry 150.

The duty cycle according to an embodiment disclosed in the disclosure is adjustable within a first range between a lower limit and an upper limit. The processor 160 may be configured to adjust the duty cycle within a second range between a second value higher than the lower limit and the upper limit based at least in part on the information about the external electronic device 200.

The processor 160 according to an embodiment disclosed in the disclosure may be configured to transmit the charging current at a frequency of the first value and at a duty cycle of the second value via the wireless charging circuitry 150 during a selected time period, adjust the frequency and the duty cycle of the charging current to a default value after the selected time period, receive a request of the external electronic device 200 after the adjustment, and change the default value based at least in part on receiving the request.

The electronic device 200 according to an embodiment disclosed in the disclosure may further include a wireless communication circuitry located in the space. The processor 160 may be configured to receive information about whether the housing 110 is combined with a cover case 600, via the wireless communication circuitry, and adjust the duty cycle within the second range based on the information.

The processor 160 according to an embodiment disclosed in the disclosure may be configured to receive the information about the external electronic device 200 through a ping phase and an identification and configuration phase.

An electronic device 100 according to an embodiment disclosed in the disclosure may include a housing 110 including a first plate 111, a second plate 112 spaced apart from the first plate 111 and facing the first plate 111, and a side member 113 which at least partially surrounds a space between the first plate 111 and the second plate 112, a display 120 located in the space and shown through the first plate 111, a conductive coil 140 parallel to the second plate 112 and disposed between the display 120 and the second plate 112, a wireless charging circuitry 150 electrically connected to the conductive coil 140, and a processor 160 operatively connected with the display 120 and the wireless charging circuitry 150. The processor 160 may apply a charging current to the conductive coil 140 via the wireless charging circuitry 150, when receiving a power control signal from an external electronic device 200, may increase a frequency of the charging current to have a first value, and may decrease a duty cycle of the charging current to have a second value between a minimum duty cycle and a maximum duty cycle, which are adjustable by the wireless charging circuitry 150, when the frequency of the charging current is the first value.

The processor 160 according to an embodiment disclosed in the disclosure may receive information about the external electronic device 200 from the external electronic device 200 via the conductive coil 140 and may apply a charging current corresponding to the information to the conductive coil 140 via the wireless charging circuitry 150.

The information about the external electronic device 200 according to an embodiment disclosed in the disclosure may include at least any one of a manufacturer, a product code, a maximum power, and a charging state of the external electronic device 200.

The processor 160 according to an embodiment disclosed in the disclosure may increase a frequency of the charging current to have the first value during a first time.

The processor 160 according to an embodiment disclosed in the disclosure may decrease a duty cycle of the charging current to have the second value during a second time subsequent to the first time.

The processor 160 according to an embodiment disclosed in the disclosure may decrease the frequency of the charging current and may increase the duty cycle, during a third time subsequent to the second time.

The processor 160 according to an embodiment disclosed in the disclosure may receive power information received by the external electronic device 200 via the conductive coil 140.

The power information according to an embodiment disclosed in the disclosure may include information for requesting to increase or decrease power to be transferred by the electronic device 100 and a power value received by the external electronic device 200.

The processor 160 according to an embodiment disclosed in the disclosure may change the frequency and the duty cycle of the charging current based on the power information.

When the second plate 112 is combined with a cover case 600, the processor 160 according to an embodiment disclosed in the disclosure may decrease the duty cycle to the minimum duty cycle.

According to an embodiment disclosed in the disclosure, a separation distance between the conductive coil 140 and a conductive coil 240 included in the external electronic device 200 may be within a specified range.

A method for wirelessly charging an external electronic device 200 according to an embodiment disclosed in the disclosure may include receiving a power control signal via a conductive coil 140 from the external electronic device 200, applying a charging current to the conductive coil 140 via a wireless charging circuitry 150, increasing a frequency of the charging current to have a first value, and decreasing a duty cycle of the charging current to have a second value between a minimum duty cycle and a maximum duty cycle, which are adjustable by the wireless charging circuitry 150, when the frequency of the charging current is the first value.

The method according to an embodiment disclosed in the disclosure may further include receiving information about the external electronic device 200 from the external electronic device 200. The applying of the charging current to the conductive coil 140 via the wireless charging circuitry 150 may include applying charging current corresponding to the information about the external electronic device 200 to the conductive coil 140 via the wireless charging circuitry 150.

The information about the external electronic device 200 according to an embodiment disclosed in the disclosure may include a manufacturer and a product code of the external electronic device 200.

Figure 7:
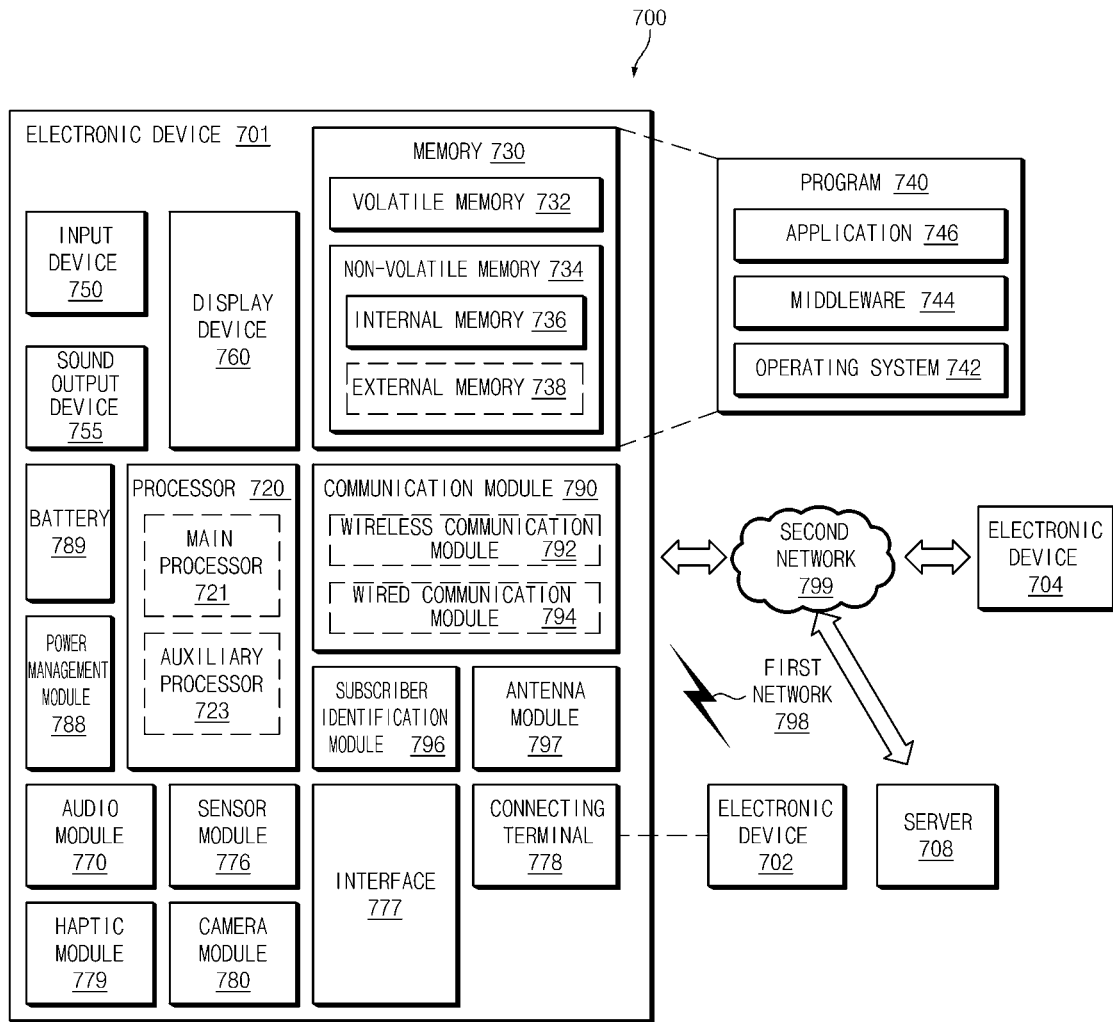
FIG. 7 is a block diagram illustrating an electronic device 701 in a network environment 700 according to various embodiments.

FIG. 7 is a block diagram illustrating an electronic device 701 in a network environment 700 according to various embodiments. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, a keyboard, or a digital pen (e.g., a stylus pen).

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., PCB). According to an embodiment, the antenna module 797 may include a plurality of antennas. In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the disclosure, the electronic device may prevent charging from being blocked at a time when wireless charging is started and may improve unstable charging efficiency.

In addition, various effects directly or indirectly ascertained through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing including a first plate, a second plate spaced apart from the first plate and a side member disposed between the first plate and the second plate;
a display disposed under the first plate;
a conductive coil disposed between the display and the second plate;
a wireless charging circuitry electrically connected to the conductive coil; and
a processor operatively connected with the display and the wireless charging circuitry, wherein the wireless charging circuitry configured to:

transmit, via the conductive coil, a charging power to an external electronic device based at least in part on a power control signal being received from the external electronic device;

increase a charging frequency corresponding to the charging power based at least in part on a determination that the power control signal includes a request to reduce the charging power; and if the charging frequency corresponding to the charging power reaches a specified frequency, maintain the charging frequency to be the specified frequency and decrease a duty cycle corresponding to the charging power.

2. The electronic device of claim 1, wherein the wireless charging circuitry is configured to:

perform the maintaining of the charging frequency and the decreasing of the duty cycle, while the power control signal including the request to reduce the charging power is received from the external electronic device.

3. The electronic device of claim 1, wherein the wireless charging circuitry is configured to:

perform the decreasing of the duty cycle gradually until the duty cycle reaches a specified duty cycle.

4. The electronic device of claim 3, wherein the wireless charging circuitry is configured to:

if the duty cycle reaches a specified duty cycle, maintain the duty cycle to be the specified duty cycle at least temporarily.

5. The electronic device of claim 1, wherein the wireless charging circuitry is configured to:

perform the decreasing of the duty cycle such that the duty cycle is adjusted within a specified range between a first duty cycle and a second duty cycle higher than the first duty cycle, the first duty cycle value and the second duty cycle value set with respect to the wireless charging circuitry.

6. A portable communication device comprising:
a touchscreen display;
a battery;
a communication circuit;
a conductive coil;
a wireless charging circuitry electrically connected to the conductive coil and the battery; and
a processor operatively connected with the display, the communication circuit, and the wireless charging circuitry,
wherein the processor configured to:
  activate a wireless power transfer function with respect to the wireless charging circuitry based at least in part on a user input received via the touchscreen display;
wherein the wireless charging circuitry configured to:
  based at least in part on the activating of the wireless power transfer function, receive, via the conductive coil, information about an external electronic device from the external electronic device;
  receive, via the conductive coil, a power control signal from the external electronic device;
  while the power control signal is received from the external electronic device, transmit, via the conductive coil, a charging power to the external electronic device;
  while a reduction of the charging power is requested via the power control signal from the external electronic device, increase a charging frequency corresponding to the charging power until the charging frequency reaches a specified frequency; and
if the charging frequency corresponding to the charging power reaches a specified frequency, maintain the charging frequency to be the specified frequency and decrease a duty cycle corresponding to the charging power.

* * * * *